United States Patent
Doebele et al.

(10) Patent No.: US 8,056,332 B2
(45) Date of Patent: Nov. 15, 2011

(54) METHOD FOR ACTIVATING AN ACTUATING MEANS

(75) Inventors: Bernd Doebele, Salem (DE); Martin Miller, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 612 days.

(21) Appl. No.: 12/299,517

(22) PCT Filed: Apr. 25, 2007

(86) PCT No.: PCT/EP2007/054013
§ 371 (c)(1),
(2), (4) Date: Nov. 4, 2008

(87) PCT Pub. No.: WO2007/128690
PCT Pub. Date: Nov. 15, 2007

(65) Prior Publication Data
US 2009/0247357 A1    Oct. 1, 2009

(30) Foreign Application Priority Data
May 10, 2006    (DE) .......................... 10 2006 021 698

(51) Int. Cl.
F16D 48/06    (2006.01)
F15B 11/08    (2006.01)
(52) U.S. Cl. ................. 60/433; 60/469; 477/97
(58) Field of Classification Search ............ 60/433, 60/436, 469; 477/97
See application file for complete search history.

(56) References Cited

U.S. PATENT DOCUMENTS

| | | | |
|---|---|---|---|
| 6,015,031 A | 1/2000 | Dorfschmid et al. | |
| 6,951,526 B2 * | 10/2005 | Kuhstrebe et al. | 477/97 |
| 7,160,225 B2 | 1/2007 | Berger et al. | |
| 2004/0186645 A1 | 9/2004 | Kohno et al. | |
| 2005/0090370 A1 | 4/2005 | Berger et al. | |

FOREIGN PATENT DOCUMENTS

| | | |
|---|---|---|
| DE | 33 15 221 A1 | 10/1984 |
| DE | 36 34 743 A1 | 4/1988 |
| DE | 40 31 808 A1 | 4/1992 |
| DE | 198 49 488 A1 | 5/2000 |
| DE | 100 49 913 A1 | 4/2001 |
| DE | 103 38 558 A1 | 3/2004 |
| WO | WO-2004/063590 A1 | 7/2004 |

* cited by examiner

*Primary Examiner* — Thomas E Lazo
(74) *Attorney, Agent, or Firm* — Davis & Bujold, P.L.L.C.

(57) ABSTRACT

A method for controlling an actuating device in an automated shifting system of a motor vehicle. The position of the actuating device is determined by a path measurement system. The actuating device can be controlled by a pressure regulation device, including a pressure medium reservoir, at least two pressure lines and a switching valve for connecting a first pressure line to a pressure medium line leading to the pressure chamber of the actuating device, and a pressure regulating device for adapting the pressure level of the main pressure line to the control pressure level of the actuating device. By appropriately controlling the pressure regulation device before the piston of the actuating device moves in the intended direction, it is moved in the direction opposite to the intended movement direction. When this movement direction is registered the movement direction is changed to the intended movement direction.

10 Claims, 2 Drawing Sheets

METHOD FOR ACTIVATING AN ACTUATING MEANS

This application is a national stage completion of PCT/EP2007/054013 filed Apr. 25, 2007, which claims priority from German Application Serial No. 10 2006 021 698.9 filed May 10, 2006.

FIELD OF THE INVENTION

The invention concerns a method for the control of an actuating device.

BACKGROUND OF THE INVENTION

With regard to their main components, automated shift systems consist of conventional, sometimes even manually actuated shift systems in which the actuation of the shifting and/or starting clutch, between the drive engine and the transmission, and the selection and shifting of transmission gears is carried out automatically byway of corresponding actuating devices. These actuating devices are usually in the form of hydraulically or pneumatically actuated piston-cylinder arrangements or electric actuators, which act upon the control elements for the transmission functions.

In such piston-cylinder arrangements, a piston is fitted to move axially in a cylinder. The piston delimits a pressure chamber filled with a pressure medium and the piston can be in direct contact with the cylinder. Otherwise, sealing mechanisms can be arranged between the cylinder and the piston. When the piston-cylinder arrangement is actuated, the piston moves axially in the cylinder and as a result of adhesive sticking can be excited into uncomfortable and acoustically perceptible vibrations. To avoid such vibration, which is also referred to as the stick-slip effect, the surface of the piston is provided with a special lubricant. A disadvantage of this is that the stick-slip effect cannot be permanently eliminated by lubricating the surface of the piston and in particular not over the lifetime of a piston-Cylinder arrangement.

In the case of automated shift systems with a pneumatically or hydraulically actuated clutch or with foot-operated clutches with a pneumatic or hydraulic transfer path and pneumatic or hydraulic amplification, various influences can lead to stick-slip effects when the clutch is actuated including component wear, binding or contamination. Such influences can be present not just in the piston/cylinder arrangement, but also throughout the clutch actuation system. In addition, these influences can result in an increase of the hysteresis that exists when the clutch is released. The stick-slip effect can be manifested as a brief adhesion of the friction lining of a clutch disk to the opposed friction surfaces of the clutch pressure plates, followed by release of the static friction or when a piston-cylinder arrangement is actuated. It may result from adhesive binding between the cylinder and the piston. Static friction can also occur on contact surfaces in the mechanical transmission path where the direction changes or at bearing bolts. In the case of a gear change transmission designed as a claw transmission "tooth-over-tooth positioning" can take place. When clutch teeth are in a condition of mutual contact under stress and the vehicle's clutch is engaged so that the increasing torque turns the teeth relative to one another, the clutch teeth may mesh. Particularly in the case when a "tooth-over-tooth position" is resolved when at rest, when the clutch is brought from the disengaged condition to the locking position, increasing hysteresis can result in uncontrollable engagement movements of the clutch since the shifting force of the piston-cylinder arrangement must be reduced compared with the clutch force. If a clutch is in the locking position, then a small mount of torque is transmitted by the clutch.

DE 100 49 913 A1 discloses a transmitting cylinder for a hydraulic clutch or brake system. This transmitting cylinder consists of a housing in which a piston is arranged and can move axially. The piston delimits a pressure chamber filled with a hydraulic fluid and at least one sealing element is arranged between the housing and the piston. Preferably, the sealing element is positioned in a rotationally fixed manner on the housing of the transmitting cylinder. When the transmitting cylinder is actuated, the piston and the at least one sealing element are rotated relative to one another, preferably with the piston rotating relative to the sealing element. By way of this changed direction of movement when the piston is actuated, there occurs at the contact surface, between the sealing element and the surface of the piston, a modified transition from static to sliding friction, which largely avoids the stick-slip effect.

DE 100 49 913 A1 also discloses a second embodiment of the transmitting cylinder in which at least in a displacement zone of the at least one sealing element, the piston has a structured surface. In this way, the adhesive contact, between the sealing element and the piston surface can be minimized so that the excitation of vibrations, due to transitions from static to sliding friction, can also be minimized or eliminated.

For controlling hydraulic or pneumatic actuating means, pressure-generating and control devices are needed which, in accordance with the prior art, comprise a hydraulic or pneumatic pump as the pressure generating device, a pressure reservoir, a hydraulic or pneumatic control unit with control values and sensors, which are connected to a central control and regulation device and which can be actuated by the latter in accordance with control and regulation functions stored therein.

The disadvantages of the prior art are that with conventional piston-cylinder arrangements the stick-slip effect cannot be lastingly eliminated by lubricating the piston surface so that in the known solutions it is either necessary to superimpose rotational movement on the axial movement of the piston or to carry out costly machining of the piston surface to minimize or eliminate the excitation of vibration that results from the transitions from static to sliding friction. In addition, stick-slip effects that occur in a shift and/or starting clutch have an adverse action on the transfer behavior of the clutch.

The purpose of the present invention is to indicate a method for the control of an actuating device by which the disadvantages of the prior art are minimized or eliminated.

SUMMARY OF THE INVENTION

In the method, an actuating device is controlled by a pressure regulation device in such a manner that movement in an intended direction of a piston of the actuating device is preceded by movement opposite to the intended direction of movement.

When this movement direction is registered a change is made to the intended movement direction, the direction reversal taking place from the said movement. By actuating the actuating means in the opposite direction, an external force, such as a clutch force, that acts upon the actuating device becomes larger. Owing to this increased level of force, possible stick-slip effects are overcome at the point of reversing the movement direction.

When this method for controlling a clutch is used, such as for a shift and/or starting clutch located between the drive engine and the transmission, before moving in the "engaging"

direction the clutch is moved in the "disengaging" direction. This increases the clutch force that acts upon the actuation device. When the movement in the "disengaging" direction is registered, a change is made to the "engaging" movement direction, such that the direction reversal takes place upon registering the movement. Thus, any stick-slip effects that occur, take place when the clutch is actuated in the "disengaging" direction so they have no influence on the transfer behavior of the clutch. Possible stick-slip effects at the movement direction reversal point are overcome by an increased force level at that point. Since the engaging movement is preceded by a movement in the disengaging direction, the effect of a possible path-jump, due to the overcoming of a hysteresis, is reduced. A routine for controlling the actuating means can either automatically proceed or only become active when the actual position of the actuating device or clutch does not approach its nominal position by a defined quantum within a given observation period. The routine can be controlled or regulated by a control and regulation device.

BRIEF DESCRIPTION OF THE DRAWINGS

The invention will now be described, by way of example, with reference to the accompanying drawings in which.

DETAILED DESCRIPTION OF THE INVENTION

Figure 1:
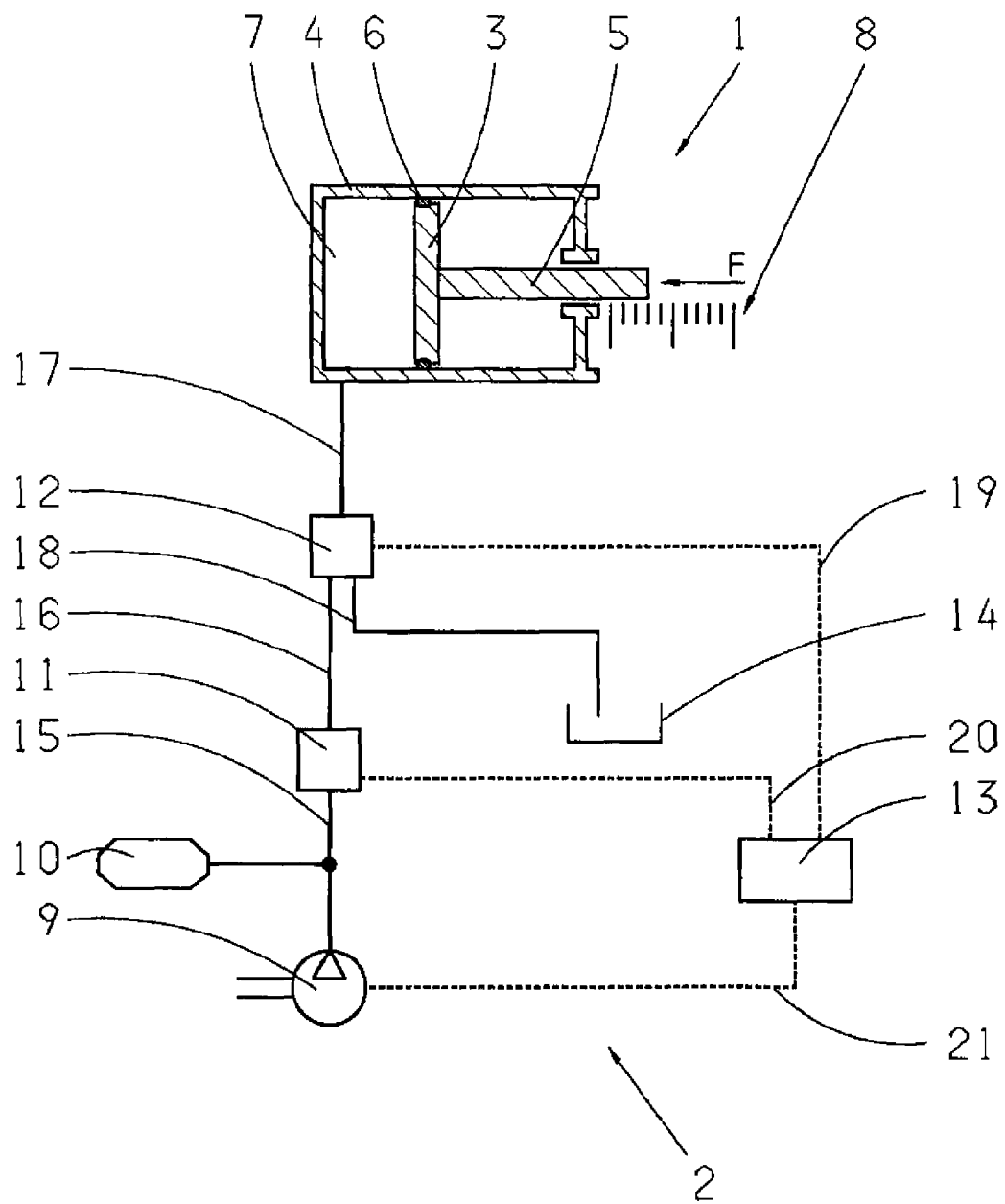
FIG. 1 is an actuating device that can be actuated by a pressure regulation device.

FIG. 1 shows an actuating device 1, in the form of a piston-cylinder arrangement. The actuating device 1 comprises a cylinder 4, a piston 3 and a piston rod 5. A seal 6 can be arranged between the piston 3 and the cylinder 4. When the actuating device 1 is actuated, an external force F acts upon the piston rod 5. A pressure regulation device 2 is used to control and/or regulate the actuating device 1. To supply the actuating device 1 with pressure, a pressure generating device 9 is provided, for example a pump, which brings a pressure medium to a main pressure. This main pressure exists in a main pressure line 15 which is connected to a pressure medium reservoir 10. In the pressure medium reservoir 10, a comparatively large volume of the pressure medium brought to the main pressure by the pressure generating device 9 is stored intermediately, since the pressure generating device 9 preferably works discontinuously. To the main pressure line 15 is arranged a pressure regulation device 11, for example a 2/2-way valve or a proportional valve. The pressure regulation device 11 forms a connection between the main pressure line 15 and a control pressure line 16 according to need. By way of a switching valve 12, for example an electromagnetic 3/2-way valve, a connection is formed or broken between the control pressure line 16 and a pressure medium line 17 of the actuating device 1. The pressure medium line 17 is connected to a pressure chamber 7 of the actuating device 1. By actuating the valves 11, 12 appropriately, a corresponding control pressure can be directed to the pressure chamber 7 of the actuating device 1. Likewise, by appropriate actuation of the valves 11, 12, the pressure chamber 7 of the actuating device 1 can be emptied. Thus, the piston 3 in the cylinder 4 can be moved in the respective desired direction. The pressure regulation device 11, the switching valve 12 and the pressure generating device 9 are connected, via electric signal lines 19, 20, 21, to a control and regulation device 13. From the control and regulation device 13 and, among other things, as a function of operating parameters, corresponding signals are applied to the pressure regulation means 11, the switching valve 12 and the pressure generating device 9, whereby a situation-dependent actuation pressure is produced in the lines 15, 16, 17 which results in a given switching force in the pressure chamber 7 of the actuating device 1. By appropriate actuation of the switching valve 12, the pressure medium displaced by actuation of the actuating means 1 is delivered, via a return-flow line 18, to a container that serves as a pressure medium sink 14 or, in the case of pneumatic actuation, simply discharged to the surroundings.

The actuating device 1 is actuated by the pressure regulation device 2 in such a manner that intended movement of the piston 3 to the left in the plane of the drawing is preceded by movement of the piston 3 to the right in the plane of the drawing. To move the piston to the right, the valves 11, 12 are actuated so that the pressure chamber 7 of the actuating device 1 is emptied by the valve 11, 12. When the piston movement to the right in the plane of the drawing is registered, the direction of movement is changed to the desired direction, this direction reversal taking place from the intended movement. In this case, the piston movement is registered by a path measurement system 8, for example a path sensor arranged internally or externally on the actuating device 1.

For example, if a shift and/or starting clutch between the drive engine and the transmission is actuated by the actuating device 1, the latter is moved in the "disengaging" direction before moving in the "engaging" direction. This increases the clutch force F that acts upon the piston rod 5 of the actuating device 1. As soon as the movement in the "disengaging" direction is registered, the movement direction is changed to "engaging" and in this the direction reversal takes place from the intended movement.

Thanks to the method, any stick-slip effects that occur when the clutch or actuating device 1 is actuated, are effectuated in the "disengaging" direction and therefore have no influence on the transfer behavior of the clutch. Possible stick-slip effects at a reversal point 28 (see FIG. 2) are overcome by the higher level of force that prevails at the reversal point 28. Since the "engaging" movement is preceded by movement in the "disengaging" direction, the effect of a possible path-jump due to overcoming a hysteresis is reduced or avoided.

Figure 2:
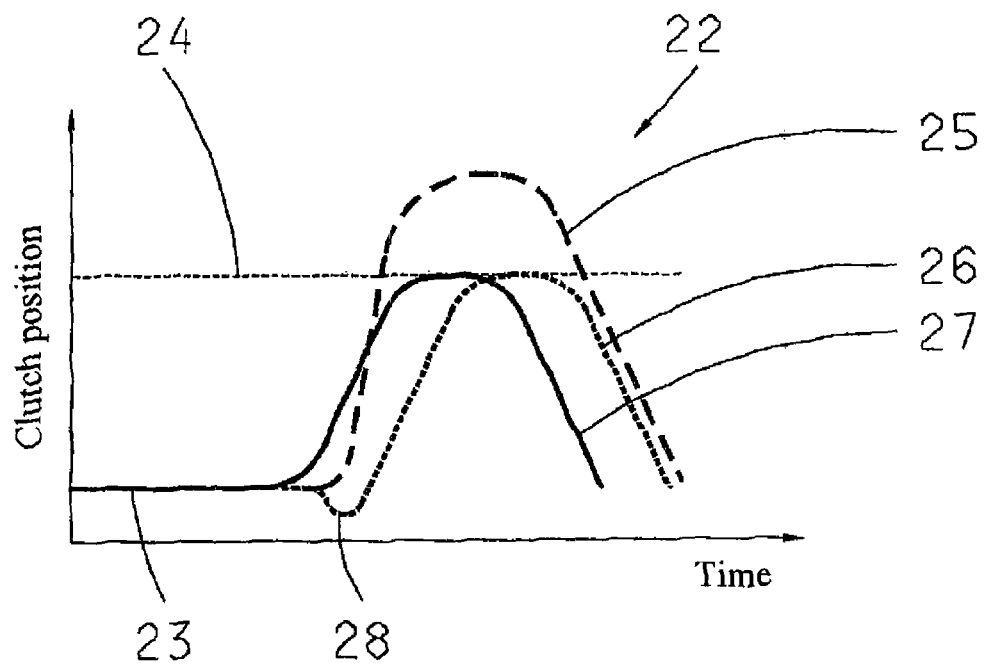
FIG. 2 is a diagram showing various clutch position variations.

FIG. 2 shows a diagram 22 in which various clutch position variations are illustrated. The diagram 22 shows a nominal position variation 27 of a clutch, a clutch position variation with stick-slip effects 25 and a clutch position variation 26 according to the invention.

Since to explain diagram 22 indexes from FIG. 1 are needed, the description of FIG. 2 given below also contains indexes from FIG. 1.

The nominal clutch position variation 27 represents an optimum case, which is striven for in practice.

In the clutch position variation 25 with stick-slip effect, an engagement point 24 of a clutch is overshot. To reach the engagement point 24 of the clutch from an open condition 23, a pressure chamber 7 of an actuating device 1 must be emptied in opposition to the clutch force F, such as that of a membrane spring. If the clutch force F is not sufficient to overcome existing static friction, the shifting force of the actuating means 1 must be reduced by further emptying of the pressure chamber 7 of the actuating device 1. When the clutch and/or the piston 3 in the cylinder 4 breaks free, the shifting force in the pressure chamber 7 of the actuating means 1 is then no longer sufficient to prevent the clutch from being displaced further, beyond the engagement point 24. If the time from breaking free until the engagement point 24 is no longer sufficient for corrective control (emptying the cylinder), then uncontrollable engagement movement of the clutch or actuating means 1 takes place, whereby the engagement point 24 is passed.

In the clutch position variation 26, before being moved in the "engaging" direction, the clutch is moved in the "disengaging" direction. This increases the clutch force F acting on the piston rod 5 of the actuating device 1. As soon as this movement in the "disengaging" direction is registered, the movement direction is reversed to "engaging", the direction reversal taking place from the movement. In the method, any stick-slip effects that occur in operating the actuating device 1 or clutch take place in the "disengaging" direction and therefore have no influence on the transfer behavior of the clutch. Possible stick-slip effects at the reversal point 28 of the movement direction are overcome by the higher level of force prevailing at the reversal point 28. Since the "engaging" movement is preceded by a movement in the "disengaging" direction, the effect of a possible path-jump due to overcoming a hysteresis is reduced and overstepping of the engagement point 24 of the clutch is prevented.

REFERENCE NUMERALS 1 actuating device, piston-cylinder arrangement
2 pressure regulation device
3 piston
4 cylinder
5 piston rod
6 seal
7 pressure chamber
8 path measurement system
9 pressure generating device
10 pressure medium reservoir
11 pressure regulation device
12 switching valve
13 control and regulation device
14 pressure medium sink
15 main pressure line
16 control pressure line
17 pressure medium line
18 return-flow line for pressure medium
19 signal line
20 signal line
21 signal line
22 diagram
23 clutch open condition
24 clutch engagement point condition
25 position variation with stick-slip effect
26 position variation according to the invention
27 nominal position variation
28 movement direction reversal point
F external force

The invention claimed is:

1. A method of controlling an actuating device (1), which includes a piston (3) and a cylinder (4), the piston (3): delimits a pressure chamber (7) filled with a medium, is axially slidable within the cylinder (4), and is connected to a piston rod (5), a position of moving parts of the actuating device (1) being detected by a path measurement system (8) and the actuating device (1) being controllable by a pressure regulation device (2), the method comprising the steps of:
by appropriate actuation of the pressure regulation device (2), moving the piston (3) of the actuating device (1), before its movement in an intended direction begins, in a direction opposite to the intended movement direction, and when this movement direction is registered, changing the direction of movement to the intended movement direction.

2. The method according to claim 1, further comprising the step of producing a higher force level at a reversal point (28) of the actuating device.

3. The method according to claim 1, further comprising the step of overcoming hysteresis to reduce effects of a path-jump.

4. The method according to claim 1, further comprising the step of automatically activating a routine for controlling the actuating device (1) each time the actuating device (1) is actuated.

5. The method according to claim 1, further comprising the step of activating a routine for controlling the actuating device (1) only if an actual position of the actuating means (1) does not approach a nominal position by a defined quantum within a predetermined observation period.

6. The method according to claim 1, further comprising the step of detecting a change of regulating position of the actuating device (1) by a path sensor (8) which is arranged one of internally and externally on the actuating device (1).

7. A device, for controlling an actuating device (1), comprising a pressure regulation device (2) and a path measurement-system (8) for determining a path of moving parts of the actuating device (1), a piston (3) of the actuating device (1) being axially movable within a cylinder of the actuating device (1) and moving through a regulating path when acted upon by an actuating pressure, appropriate operation of the pressure regulation device (2) actuates movement of the piston in a direction opposite to the intended movement direction, before the piston (3) of the actuating device (1) begins moving in an intended direction of movement, and when this movement direction is registered, then the piston (3) moves in the intended movement direction.

8. The device according to claim 7, wherein the actuating device (1) includes of a piston-cylinder arrangement.

9. The device according to claim 8, wherein the actuating device (1) is an actuator of a motor vehicle transmission.

10. A method of controlling activation of a motor vehicle transmission shifting device with an actuating device (1), the method comprising the steps of:
providing the actuating device (1) with a piston (3) and a cylinder (4);
aligning the piston (3) with the cylinder such that the piston (3) axially slides within the cylinder (4), and the piston defining a pressure chamber (7), which is fillable with a medium, and the piston being connected to a piston rod (5);
coupling the pressure chamber (7) with a pressure regulation device (2) for controlling movement of the piston (3) in a desired direction and an opposite direction with a pressure regulation device (2);
recognizing a request with the pressure regulation device (2) for movement of the piston (3) in the desired direction;
directing movement of the piston (3) in the opposite direction with the pressure regulation device (2);
detecting movement of the piston (3) in the opposite direction with a path measurement system (8); and
reversing movement of the piston (3), with the pressure regulation device (2), from movement in the opposite direction to movement in the desired direction.

* * * * *